March 9, 1965   R. P. RAGEN   3,172,215
EDUCATIONAL DEVICE
Filed Aug. 31, 1962   2 Sheets-Sheet 1
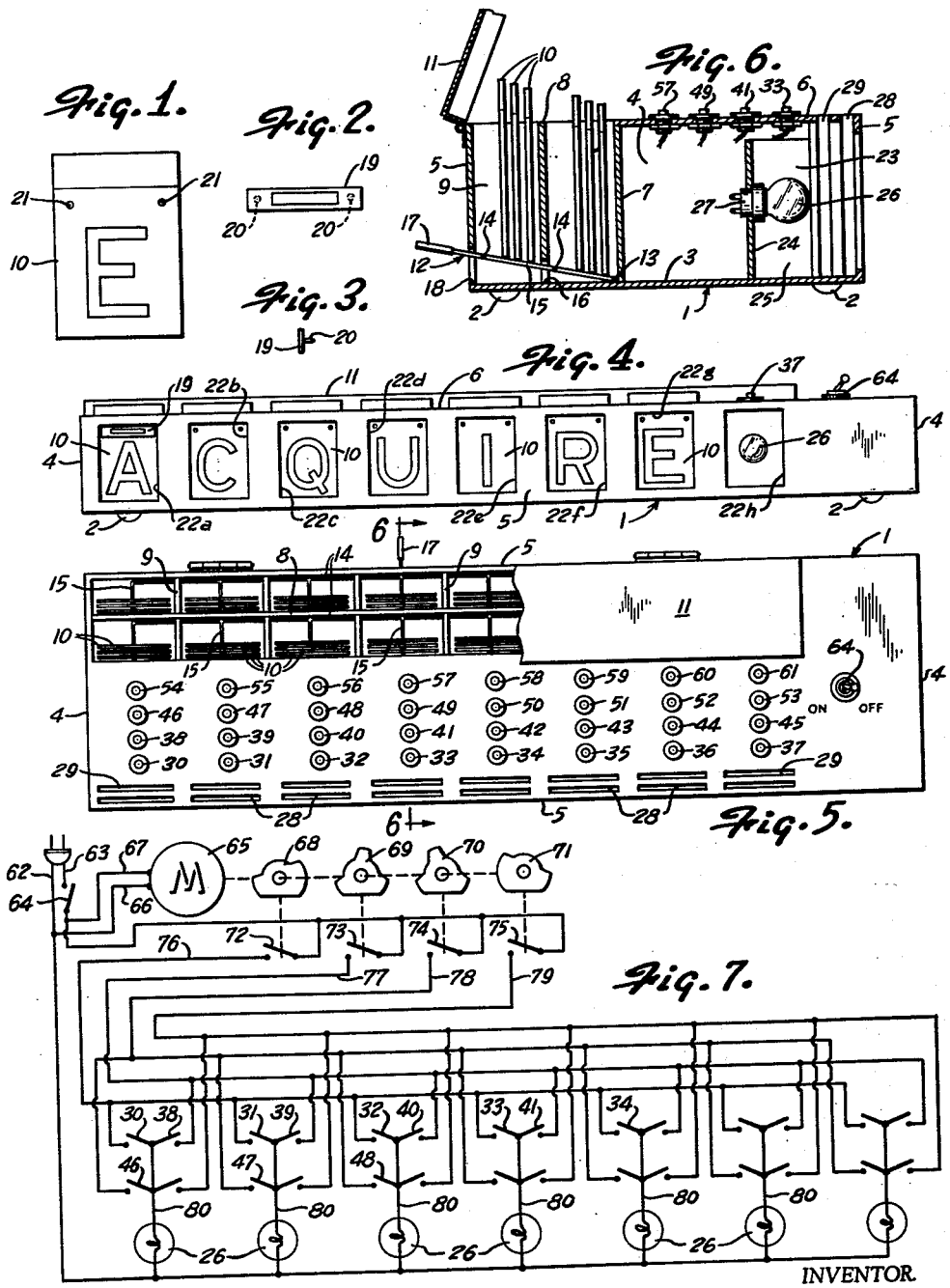
INVENTOR.
ROBERT P. RAGEN
BY Andrus & Starke
ATTORNEYS March 9, 1965 R. P. RAGEN 3,172,215
EDUCATIONAL DEVICE
Filed Aug. 31, 1962 2 Sheets-Sheet 2
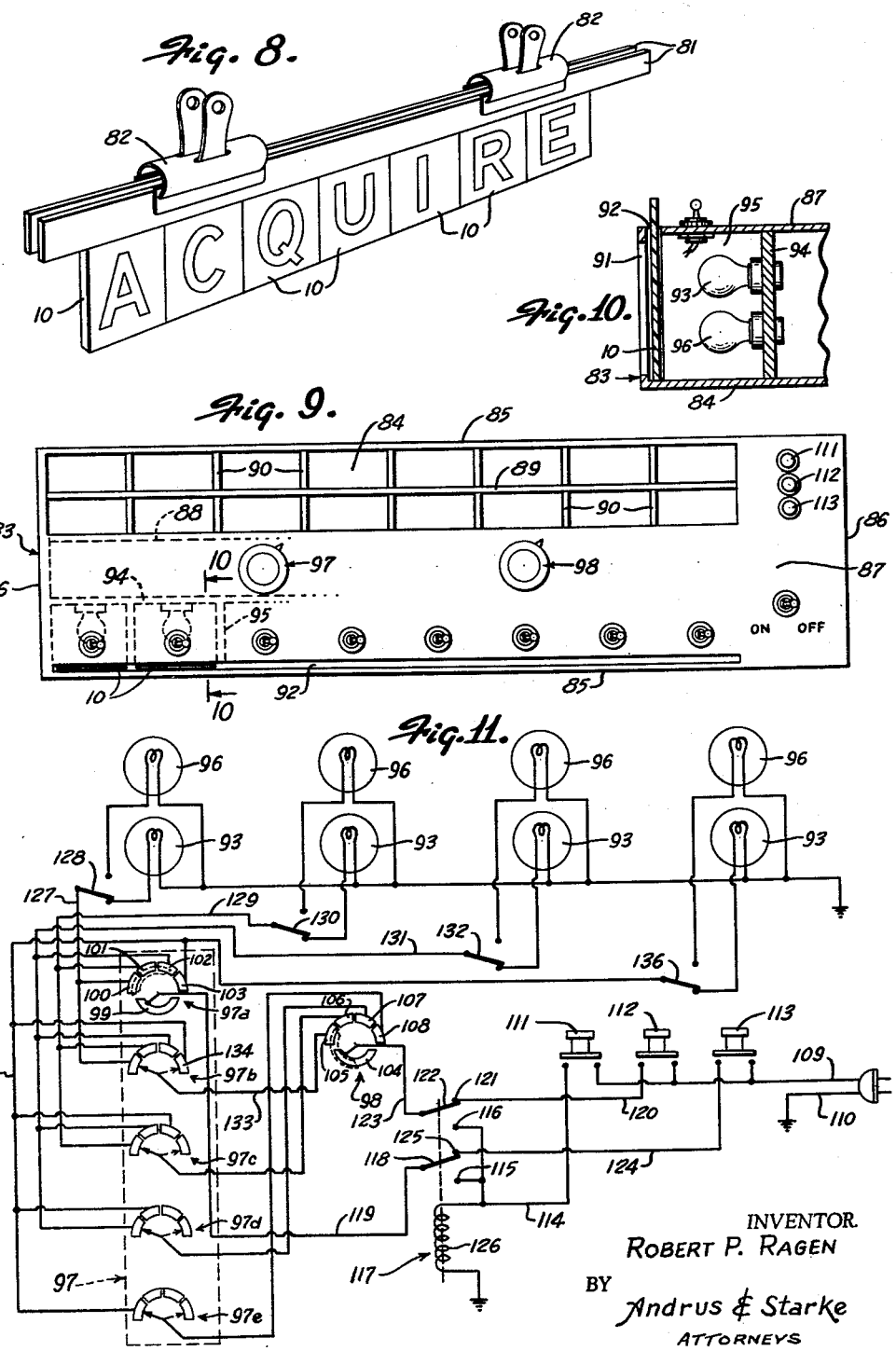
INVENTOR.
ROBERT P. RAGEN
BY Andrus & Starke
ATTORNEYS

United States Patent Office 3,172,215
Patented Mar. 9, 1965

3,172,215
EDUCATIONAL DEVICE
Robert P. Ragen, 2527 N. Oakland, Milwaukee 11, Wis.
Filed Aug. 31, 1962, Ser. No. 220,632
5 Claims. (Cl. 35—35)

This invention relates to an educational device and more particularly to an apparatus for aiding in teaching of spelling and pronunciation of words.

The present invention is directed to a pictorial educational apparatus to be used in schools for assisting in the spelling and pronunciation of words by visually presenting both the entire word and the individual syllables to the student.

More specifically, the apparatus of the invention includes a casing having a series of windows and the letters which comprise the word are inserted behind the windows and are adapted to be lighted in predetermined sequence to present the entire word and the individual syllables. A series of rows of switches are mounted on the casing with the switches of each row corresponding in number to the windows in the casing. The first row of switches corresponds to the letters of the first syllable, the second row of switches corresponds to the letters of the second syllable, etc. Depending on the particular word to be studied, the switches in the first row corresponding to the number of letters in the first syllable are manually closed, and similarly the switches in the second row corresponding to the number of letters in the second syllable are also closed. This is done for each syllable in the word. For example, if there are three letters in the first syllable, two letters in the second syllable and two letters in the third syllable, the first three switches in the first row would be closed, the fourth and fifth switches in the second row would be closed, and the sixth and seventh switches in the third row would be closed.

The syllables and word are illuminated in a predetermined sequence by a series of motor driven cams. In normal operation, the entire word is first lighted so that the student can see the word in its entirety. Subsequently, in automatic sequence, each syllable of the word is lighted and after each individual syllable has been lighted, the entire word again is presented.

In a modified form of the invention, the rows of switches are replaced by a series of rotary switches with one rotary switch being employed for each syllable. In this structure, the first rotary switch is set for the number of letters in the first syllable, the second rotary switch is set for the number of letters in the second syllable, etc. To study the word with this device, a first push-button switch is closed which illuminates the entire word. Subsequently, a second push-button switch is closed which illuminates the letters of the first syllable, and similarly each subsequent syllable can be illuminated.

Provision can be made to insert colored slides behind the letters so that emphasis can be given to difficult syllables or silent letters to aid in the study of the words.

The present invention provides a simple and inexpensive device for studying spelling and pronunciation of words. The entire word and then each individual syllable are automatically and sequentially visually presented to the student and this serves to impress the particular syllables as well as the entire word upon the student's memory with the result that he can grasp the spelling and pronunciation much more easily.

Other objects and advantages will appear in the course of the following description.

The drawings illustrate the best mode presently contemplated of carrying out the invention.

In the drawings:

FIG. 1 is a plan view of one of the slides bearing a letter of the alphabet which is used with the pictorial educational apparatus of the invention;

FIG. 2 is a view of an insert to be attached to the slide;

FIG. 3 is an end view of the insert shown in FIG. 2;

FIG. 4 is a side elevation of the apparatus of the invention;

FIG. 5 is a plan view with parts broken away of the apparatus shown in FIG. 4;

FIG. 6 is a transverse section taken along line 6—6 of FIG. 5;

FIG. 7 is a wiring diagram showing the circuitry of the device shown in FIGS. 4–6;

FIG. 8 is a perspective view of a clamping arrangement for the slides;

FIG. 9 is a plan view of a modified form of the invention using rotary switches;

FIG. 10 is a section taken along line 10—10 of FIG. 9; and

FIG. 11 is a wiring diagram showing the circuitry of the apparatus shown in FIGS. 9 and 10.

The drawings illustrate an educational apparatus which comprises a casing 1 which is supported on legs 2. The casing 1 includes a bottom wall 3, a pair of side walls 4 and a pair of end walls 5 which are joined together to form the generally rectangular box-like casing. The upper end of the casing 1 is partially enclosed by a top wall 6.

The casing 1 is divided into storage and lighting compartments by a central wall 7 which extends the length of the box. In addition to wall 7, a longitudinal partition 8 and a series of cross partitions 9 divide the rear portion of the casing into a series of small storage compartments which hold slides 10. The storage compartments are adapted to be closed by a cover 11 which is hinged to the rear wall 5.

The slides 10, which are stored within the storage compartments, are adapted to be lifted upwardly for easy removal by a lifting frame 12 which is hinged at 13 to the casing 1. The frame 12 comprises a series of longitudinal elements 14 which are connected together by cross members 15. As best shown in FIG. 6, the partition 8 is provided with a series of slots 16 which receive the elements 14 and enable the lifting frame to be pivoted upwardly. The slides 10 rest on the cross members 15 of the lifting frame, and the frame 12 is adapted to be pivoted upwardly by handle 17 which extends outwardly through a slot 18 in the rear end wall 5. By pivoting the frame 12 upwardly, the slides 10 are moved above the level of the casing 1 where they can be conveniently removed from the storage compartments.

As best shown in FIGS. 1–3, each slide is generally rectangular in shape and contains a letter of the alphabet. Either the letter or the background is transparent or translucent and the other portion is opaque so that when the slide is illuminated, the letter will stand out against the background.

A provision is also made for attaching sound symbols to the slide 10. This is accomplished by the inserts 19 which contain the sound symbols. The inserts 19 are provided with dowels 20 which can be inserted within suitable openings 21 in the slides 10.

The slides 10 containing the letters are adapted to be inserted behind a series of windows 22a–h formed in the front end wall 5 of the box 1. A lighting compartment 23 is provided behind each of the windows 22a–h, and each compartment 23 is defined by wall 24, which extends parallel to front end wall 5, and walls 25 which connect the front wall 5 to the wall 24. The slides 10 are adapted to be iluminated by a bulb 26 which is attached within socket 27 secured to the wall 24 in each compartment.

The top wall 6 of the casing 1 is provided with two rows of slots 28 and 29 which are in alignment with the windows 22a–22h. The slides 10 containing the letters are adapted to be inserted within the slots 28 and a series of colored slides, not shown, can be inserted within the slots 29, if desired, and serve to provide color for particular letters in the event that a certain syllable is to be emphasized or is hard to pronounce if a silent letter is present in the word.

To illuminate the slides 10 contained within the windows 22a–22h, a series of rows of switches are mounted on the upper wall 6 with the switches in each row corresponding in number to the windows 22a–22h. As best shown in FIG. 5, a first row of switches 30–37 is mounted immediately behind the windows 22a–22h and the first row of switches is followed by a second row of switches 38–45, a third row of switches 46–53 and a fourth row of switches 54–61. Each row of switches corresponds to a syllable and the apparatus as shown is adapted to present a maximum of four syllables. If the device is to be used for a greater number of syllables, the number of rows of switches would be increased to correspond to the maximum number of syllables to be presented.

Referring to FIG. 7, which is the wiring diagram, power lines 62 and 63 are connected to a suitable source of power and an on-off switch 64 is connected in line 63. A motor 65 is connected to the power lines by lines 66 and 67 and the motor is operably connected to and drives a series of cams 68, 69, 70 and 71. The number of cams corresponds to the number of syllables and for a four-syllable machine, four cams would be employed, as shown in FIG. 7.

Cams 68–71 are rotated by operation of the motor 65 and the cams are adapted to actuate and periodically close cam switches 72, 73, 74 and 75, respectively, during cyclic rotation of the cams. Cam switch 72 is connected in line 76 which connects the power line 62 with the switches 30–37 of the first row. Similarly, the switch 73 is connected in line 77 which connects the power line 62 to the switches 38–45 of the second row, and cam switch 74 is located in line 78 which connects the power line 62 to the switches 46–53 of the third row. Cam switch 75 is connected in line 79 which connects the power line 62 to the switches 54–61 of the fourth row. Lines 80 connect the switches located in alignment with each window with the corresponding bulb 26.

In operation of the apparatus, the student selects the slides 10 containing the letters of the word which is to be studied and inserts the slides in slots 28. As an example, FIG. 4 shows the letters of the word ACQUIRE located in the windows 22a–g of the casing. An insert 19 is positioned above the letter A in the first window 22 having the sound symbol indicating that it is a short A.

As the word ACQUIRE is formed of two syllables, AC and QUIRE, switches 30 and 31 of the first row would be closed indicating there are two letters in the first syllable and switches 40–44 of the second row would be closed indicating that there are five letters in the second syllable. As the word does not contain a third and fourth syllable, no switches in the third or fourth row would be closed. The on-off switch 64 is then closed to start the motor 65 and rotate the cams. The cams are arranged with contours so that upon initial rotation, all four of the switches 72–75 will be closed, which results in the current passing through lines 76 and 77 to light up the windows 22a–g which results in all of the letters of the word ACQUIRE being illuminated.

Following this, subsequent rotation of the cams will release or open switches 73, 74 and 75, while switch 72 will remain closed. Current will then flow only through line 76 to illuminate bulbs 26 located behind the windows 22a and 22b, which is the first syllable AC of the word.

As the cams rotate, the switch 72 will be open and the switch 73 will be closed, which results in current flowing to line 77 and through closed switches 40–44 to energize the bulbs 26 in windows 22c–22g and thereby illuminate the syllable QUIRE.

Subsequent rotation of the cams will open switch 73 and close switch 74 and then switch 75. As none of the switches in the third or fourth row are closed, the closing of switches 74 and 75 will not illuminate any slides in the windows. At the end of the cam rotation cycle, all of the cam switches 72–75 will again be closed with the result that all of the letters in the word appearing in windows 22a–g are again illuminated.

The system aids in learning the spelling or pronunciation of words, for it initially illuminates the entire word so that the student can obtain an idea of the over-all spelling and appearance of the word. Subsequently, each individual syllable is separately illuminated so that the student again can see the spelling and appearance of each individual syllable. Following the illumination of the individual syllables, the entire word is again illuminated which provides the student with a final pictorial representation of the entire word.

FIG. 8 shows a modified form of the invention in which the slides 10 containing the letters are clamped between bars 81 by spring clamping members 82. The slides containing the desired letters forming the word to be studied are inserted between the bars with the side edges in engagement and clamped therein by the clamps 82. This arrangement enables the words to be studied to be pre-assembled before the class period and saves the time of assembly during the class period.

In this embodiment the casing 83 includes a bottom wall 84, a pair of end walls 85 and a pair of side walls 86 which are connected to the end walls and bottom walls to provide a generally rectangular casing. In addition, a top wall 87 extends partially over the open top of the casing 83.

The casing 83 is divided into a storage compartment and a lighting compartment by a longitudinal partition wall 8. In addition, the storage compartment is divided into a series of small storage chambers by a longitudinal partition 89 and a series of cross partitions 90.

As in the case of the first embodiment, the front end wall 85 is provided with a series of windows 91 and the slides 10, carried by the clamping bars 81, are inserted within a continuous slot 92 formed in the top wall 87 so that the slides 10 are visible through the windows 91. The letters on the slides 10 are illuminated by a series of light bulbs 93 which are secured within wall 94 which extends longitudinally of the box. Transverse walls 95 are connected between the wall 94 and the front wall 85 to provide a series of individual lighting compartments behind each window. In addition to the bulb 93, a second bulb 96, which is colored red, yellow or the like, is also secured to the wall 94 in each lighting compartment. Bulbs 93 and 96 can be selectively lighted to thereby illuminate each individual letter with either white or colored light. As in the case of the first embodiment, if it is desired to emphasize one particular syllable, or emphasize a silent letter or the like, this syllable or letter can be illuminated in a color by means of the colored bulbs 96.

The word and syllables are manually illuminated in sequence, and rotary switches are employed to set the number of letters in each syllable. A rotary switch is employed for each syllable to be used, and as shown in FIG. 11, two rotary switches 97 and 98 are used corresponding to a maximum of two syllable words. However, if it is desired to have the apparatus function up to four or more syllables, four or more rotary switches would be employed, one for each syllable.

The rotary switch 98 consists of five decks 97a, 97b, 97c, 97d and 97e. The deck 97a includes a rotary wiper element 99 and four contacts 100, 101, 102 and 103 which are adapted to be contacted by the wiper element. In the "off" position the wiper 99 will be out of contact with contacts 100–103.

Each of the other decks of switch 97 also includes four contacts and a pointer is tied in with the wiper 99 and is normally in engagement with the first contact of each deck, as shown by the solid lines in FIG. 11.

When the system is set for a two-syllable word, such as BUSY, the rotary switch 97 is set for three letters and the wiper 99 extends over contacts 100, 101 and 102. Similarly, the pointers of the decks 97b–97e, which are normally in the first contact position, are moved with the wiper 99 so that they are in engagement with the fourth contact, as shown by the dashed lines in FIG. 11.

The rotary switch 98 contains a single deck and includes a rotary wiper element 104 and a series of contacts 105, 106, 107 and 108.

As shown in the wiring diagram FIG. 11, the power lines 109 and 110 are connected to a suitable source of power and the line 110 is connected to ground. Line 109 is connected in series with one contact of push-button switches 111, 112 and 113. The second contact of switch 111 is connected by line 114 to contacts 115 and 116 of double-pole, double-throw relay switch 117 and also to relay winding 126. The arm 118 of relay switch 117 is connected by line 119 to the wiper element 99 of the first deck 97a of the rotary switch 97.

The push-button switch 112 is connected by line 120 to contact 121 of relay switch 117 and the switch arm 122 is connected by line 123 to wiper element 104 of rotary switch 98. The push-button switch 113 is connected by line 124 to contact 125 of relay switch 117. When the button 111 is depressed, current will energize the relay coil 126 of relay switch 117 to move switch arms 118 and 122 into engagement with contacts 115 and 116, respectively, with the result that current will flow through line 119 to the wiper element 99 and through contacts 100, 101 and 102. The current passing through contact 100 will pass through line 127 and closed switch 128 to illuminate the light 93 behind the first window in the box. Similarly, the current will flow through contact 101, line 129 and closed switch 130 to illuminate the light behind the second window, while current will also flow through contact 102, line 131 and closed switch 132 to illuminate the light 93 behind the third window.

The switches 128, 130, 132 and 136 serve to control the white lightbulb 93 and the colored lightbulb 96 associated with each window.

When button 111 is depressed, current will also flow through line 123 to wiper 104 of rotary switch 98. As wiper 104 is in the first contact position, as shown by the dashed lines in FIG. 11, indicating the second syllable has one letter, current will flow through contact 105, and line 133 to contact 134 of deck 97b (the pointer of deck 97b being in the fourth contact position) and then through line 135 and closed switch 136 to lightbulb 93 associated with the fourth window.

Thus, when the button 111 is depressed, the letters of both syllables will be illuminated. The purpose of the decks 97b–97e is to compensate for the letters of the first syllable so that the second rotary switch 98 can be set for the number of letters in the second syllable regardless of the number of letters in the first syllable.

When button 111 is released and button 113 is depressed current will flow through line 124, contact 125 and line 119 to wiper 99 and thereby light up the bulbs 93 in the first three windows which correspond to the first syllable. By depressing button 112, current will flow only to switch 98 and then through line 133 and 135 to light only the bulb 93 in the fourth window, which corresponds to the second syllable of the word.

With this circuitry, the entire word, including all syllables, can be illuminated by depressing the button 111, and each individual syllable can be illuminated by depressing the buttons 112 and 113. This system is somewhat different than that described in connection with the first embodiment in which the entire word and syllables are automatically illuminated in timed sequence. In this system, the word and the syllables are illuminated manually by the instructor and held or maintained illuminated for the desired period of time.

The present invention provides a system for teaching spelling and pronunciation in which the word and the syllables are presented pictorially to the student so that the word, syllables and letters will be imprinted in his memory.

While the above description is directed to the letters being on slides which are inserted into the casing, it is contemplated that the letters may instead be mounted on drums in which case the drums would be rotated to position the desired letter in the window, or the slides may be mounted in any other desired manner.

In addition, the apparatus may be used as an aid in other forms of teaching and in this case, the letters on the slides can be replaced by other desired indicia.

Various modes of carrying out the invention are contemplated as being within the scope of the following claims particularly pointing out and distinctly claiming the subject mater which is regarded as the invention.

I claim:

1. An educational apparatus for studing a word having a plurality of syllables, comprising a casing having a series of windows therein, a lighting member associated with each window, a plurality of indicia carrying members, means for removably mounting said members in the windows, a first series of switches corresponding in number to the number of windows and each switch connected in series with the lighting member of the respective window, each switch of said first series being connected in parallel in a first electric circuit with the other switches of the series, first switch means connected in said electric circuit in series with said first series of switches, a second series of switches corresponding in number to the number of windows, with each of said switches of the second series connected in series with the lighting member of the resepective window, each of said switches of the second series being connected in parallel with the other switches of the second series in a second electric circuit, second switch means connected in the second electric circuit in series with the switches of the second series, a number of the switches of the first series corresponding in number and position to the letters in the first syllable of the word to be studied adapted to be manually closed and a number of switches of the second series corresponding in number and position to the letters in the second syllable being manually closed, and means for selectively closing the first switch means and the second switch means to thereby selectively illuminate the lighting members associated with the closed switches of said first series and the lighting members associated with the closed switches of said second series in a programmed sequence.

2. An educational apparatus for studing a word having a plurality of syllables, comprising a casing having a series of windows therein, a lighting member associated with each window, a plurality of indicia carrying members, means for removably mounting said members in the windows, a first series of switches corresponding in number to the number of windows and each switch connected in series with the lighting member of the respective window, each switch of said first series being connected in parallel in a first electric circuit with the other switches of the series, a second series of switches corresponding in number to the number of windows, with each of said switches of the second series connected in series with the lighting member of the respective window, each of said switches of the second series being connected in parallel with the other switches of the second series in a second electric circuit, a number of the switches of the first series corresponding in number and position to the letters in the first syllable of the word to be studied adapted to be manually closed and a number of switches of the second series corresponding in number and position to the letters in the second syllable being manually closed, and means for selectively connecting said first and second electric circuits to a source of power to thereby selectively illuminate the lighting members associated with the closed switches of said first series and the lighting members associated with the closed switches of said second series in a programmed sequence.

3. An educational apparatus for studying a word having a plurality of syllables, comprising a casing having a series of windows therein, a lighting member associated with each window, a plurality of indicia carrying members, means for removably mounting said members in the windows, a first series of switches corresponding in number to the number of windows and each switch connected in series with the lighting member of the respective window, each switch of said first series being connected in parallel in a first electric circuit with the other switches of the series, first switch means connected in said electric circuit in series with said first series of switches, a second series of switches corresponding in number to the number of windows, with each of said switches of the second series connected in series with the lighting member of the respective window, each of said switches of the second series being connected in parallel with the other switches of the second series in a second electric circuit, second switch means connected in the second electric circuit in series with the switches of the second series, a number of the switches of the first series corresponding in number and position to the letters in the first syllable of the word to be studied adapted to be manually closed and a number of switches of the second series corresponding in number and position to the letters in the second syllable being manually closed, and drive means operably connected to said first and second switch means for closing said first and second switch means in a programmed sequence to thereby selectively illuminate the lighting members associated with the closed switches of said first series and the lighting members associated with the closed switches of said second series.

4. An educational apparatus for studing a word having a plurality of syllables, comprising a casing having a series of windows therein, a lighting member associated with each window, a plurality of indicia carrying members, means for removably mounting said members in the windows, a first series of switches corresponding in number to the number of windows and each switch connected in series with the lighting member of the respective window, each switch of said first series being connected in parallel in a first electric circuit with the other switches of the series, first switch means connected in said electric circuit in series with said first series of switches, a second series of switches corresponding in number to the number of windows, with each of said switches of the second series connected in series with the lighting member of the respective window, each of said switches of the second series being connected in parallel with the other switches of the second series in a second electric circuit, second switch means connected in the second electric circuit in series with the switches of the second series, a number of the switches of the first series corresponding in number and position to the letters in the first syllable of the word to be studied adapted to be manually closed and a number of switches of the second series corresponding in number and position to the letters in the second syllable being manually closed, means for simultaneously closing said first and second switch means to thereby simultaneously illuminate the lighting members associated with the closed switches of both said first and second series, means responsive to the actuation of the last named means for opening said second switch means to illuminate only the lighting members associated with the closed switches of said first series, and means responsive to the actuation of the last named means for opening said first switch means and closing said second switch means to thereby illuminate only the lighting members associated with the closed switches of said second series.

5. The structure of claim 3, in which the drive means is cam operated.

References Cited in the file of this patent

UNITED STATES PATENTS

| | | |
|---|---|---|
| 669,878 | Furdek | Mar. 12, 1901 |
| 1,142,947 | Ellis | June 18, 1915 |
| 2,050,805 | Pumar | Aug. 11, 1936 |
| 2,193,478 | Diebel | Mar. 12, 1940 |
| 2,982,031 | Bardelli | May 3, 1961 |

UNITED STATES PATENT OFFICE
CERTIFICATE OF CORRECTION

March 9, 1965

Patent No. 3,172,215

Robert P. Ragen

It is hereby certified that error appears in the above numbered patent requiring correction and that the said Letters Patent should read as corrected below.

Column 4, line 41, for "8" read -- 88 --; column 5, line 22, for "11" read -- 111 --.

Signed and sealed this 24th day of August 1965.

(SEAL)
Attest:

ERNEST W. SWIDER
Attesting Officer

EDWARD J. BRENNER
Commissioner of Patents